(12) United States Patent
Dalton et al.

(10) Patent No.: US 10,372,897 B2
(45) Date of Patent: Aug. 6, 2019

(54) ENCRYPTED CAPABILITIES STORED IN GLOBAL MEMORY

(71) Applicant: Hewlett Packard Enterprise Development LP, Houston, TX (US)

(72) Inventors: Chris I. Dalton, Bristol (GB); Dejan S. Milojicic, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 240 days.

(21) Appl. No.: 15/298,494

(22) Filed: Oct. 20, 2016

(65) Prior Publication Data

US 2018/0114011 A1    Apr. 26, 2018

(51) Int. Cl.
| | |
|---|---|
| *G06F 21/44* | (2013.01) |
| *G06F 12/14* | (2006.01) |
| *G06F 21/62* | (2013.01) |
| *H04W 12/08* | (2009.01) |

(52) U.S. Cl.
CPC .......... *G06F 21/44* (2013.01); *G06F 12/1408* (2013.01); *G06F 21/6218* (2013.01); *H04W 12/08* (2013.01); *G06F 2212/1052* (2013.01); *G06F 2212/402* (2013.01); *G06F 2221/2141* (2013.01)

(58) Field of Classification Search
CPC ................ H04W 12/08; G06F 21/6218; G06F 2221/2141
See application file for complete search history.

(56) References Cited

U.S. PATENT DOCUMENTS

| | | | |
|---|---|---|---|
| 5,852,666 A | 12/1998 | Miller et al. | |
| 6,049,838 A | 4/2000 | Miller et al. | |
| 7,343,493 B2 * | 3/2008 | Challener | G06F 21/57 380/44 |

(Continued)

FOREIGN PATENT DOCUMENTS

| | | |
|---|---|---|
| CN | 104519073 A | 4/2015 |
| WO | WO-2007137090 A2 | 11/2007 |

(Continued)

OTHER PUBLICATIONS

Chen el al, Certification of Public Keys Within an Identity Based System, Trusted Systems Laboratory, HP Laboratories Bristol, HPL-2003-18, Feb. 6, 2003 13 Pgs., http://www.hpl.hp.com/techreports/2003/HPL-2003-18.pdf?jumpid=reg_R1002_USEN).

(Continued)

*Primary Examiner* — Fatoumata Traore
(74) *Attorney, Agent, or Firm* — Hewlett Packard Enterprise Patent Department

(57) ABSTRACT

Example implementations relate to encrypted capabilities stored in global memory. For example, in an implementation, a capability protection system may store an encrypted capability into global memory, where the encrypted capability is encrypted based on a condition. The capability protection system may receive, from a node in communication with the global memory, a request to access the encrypted capability stored in the global memory. The capability protection system may provide to the node a decrypted form of the encrypted capability upon satisfaction of the condition by the node.

19 Claims, 6 Drawing Sheets

(56) References Cited

U.S. PATENT DOCUMENTS

| | | | |
|---|---|---|---|
| 9,264,413 B2* | 2/2016 | Zhang | H04L 63/08 |
| 9,858,016 B2* | 1/2018 | Viswanathan | G06F 3/1204 |
| 2001/0052071 A1 | 12/2001 | Kudo et al. | |
| 2006/0206616 A1 | 9/2006 | Brown | |
| 2010/0083386 A1 | 4/2010 | Kline et al. | |
| 2010/0212004 A1* | 8/2010 | Fu | G06F 21/6218 726/9 |

FOREIGN PATENT DOCUMENTS

| | | | | |
|---|---|---|---|---|
| WO | WO 2016053287 A1 * | 4/2016 | | G06F 21/33 |
| WO | WO-2016053287 A1 | 4/2016 | | |

OTHER PUBLICATIONS

Unknown, Bristol Cryptography Blog, Ciphertext Policy Attribute Based Encryption, Mar. 7, 2011, 2 Pgs., http://bristolcrypto.blogspot.co.uk/2011/03/ciphertext-policy-attribute-based.html.

"SINA—Skalierbares Sicherheits-niveau für höchste Ansprüche," Mar. 16, 2016, pp. 1-9 (incl. English Translation) [online], secunet Security Networks AG, Retrieved from the Internet on Dec. 7, 2017 at URL: <web.archive.org/web.20160316061329/https://www.secunet.com/de/themen-loesungen/hochsicherheit/sina/>.

Extended European Search Report, EP Application No. 17197398.5, dated Dec. 15, 2017, pp. 1-10, EPO.

Wikipedia, "L4 microkernel family", Retrieved from <https://en.wikipedia.org/w/index.php?title=L4_microkernel_family&oldid=719574316>, May 10, 2016, 8 pages.

Wikipedia, "EROS (microkernel)", Retrieved from < https://en.wikipedia.org/wiki/EROS_(microkernel)>, 2016, 4 pages.

Wikipedia, "Capability-based security", Retrieved from <https://en.wikipedia.org/w/index.php?title=Capability-based_security&oldid=735189902>, 2016, 5 pages.

Wikipedia, "Barrelfish", Retrieved from <https://en.wikipedia.org/w/index.php?title=Barrelfish&oldid=711117393>, 2016, 2 pages.

Singhania et al., "Capability Management in Barrelfish", Barrelfish Technical Note 013, Barrelfish Project, ETH Zurich, 2013, 43 pages.

Coulouris et al., "Mach Case Study", Distributed Systems: Concepts and Design, Edition 3, Chapter CDK3-18, 2001, pp. 1-18.

Parmer, Gabriel, "Composite Component-Based OS", Composite OS, 2013, 5 pages.

Key Logic, Inc., "KeyKOS—A Secure, High-Performance Environment for S/370", Proceedings of SHARE 52 I, Mar. 1988, pp. 3-17.

Henry M. Levy, "The IBM System/38," Capability-Based Computer Systems, 1984, pp. 137-158.

Frantz et al., "GNOSIS: A Prototype Operating System for the 1990's", (Webpage), Available at <http://cap-lore.com/Agorics/Library/KeyKos/gnosisShare.html>, 1979, 25 pages.

Coulouris et al., "Chorus", Distributed Systems—Concepts and Design, Edition 2, 1994, 11 pages.

Robert Watson, "Computer Laboratory: Capability Hardware Enhanced RISC Instructions (CHERI)", University of Cambridge, 2016, 3 pages.

* cited by examiner

ENCRYPTED CAPABILITIES STORED IN GLOBAL MEMORY

BACKGROUND

A computing system and an operating system thereof may employ capabilities to represent, address, and grant access to system objects or resources, such as memory.

BRIEF DESCRIPTION OF THE DRAWINGS

Various examples will be described below with reference to the following figures.

Figure 1:
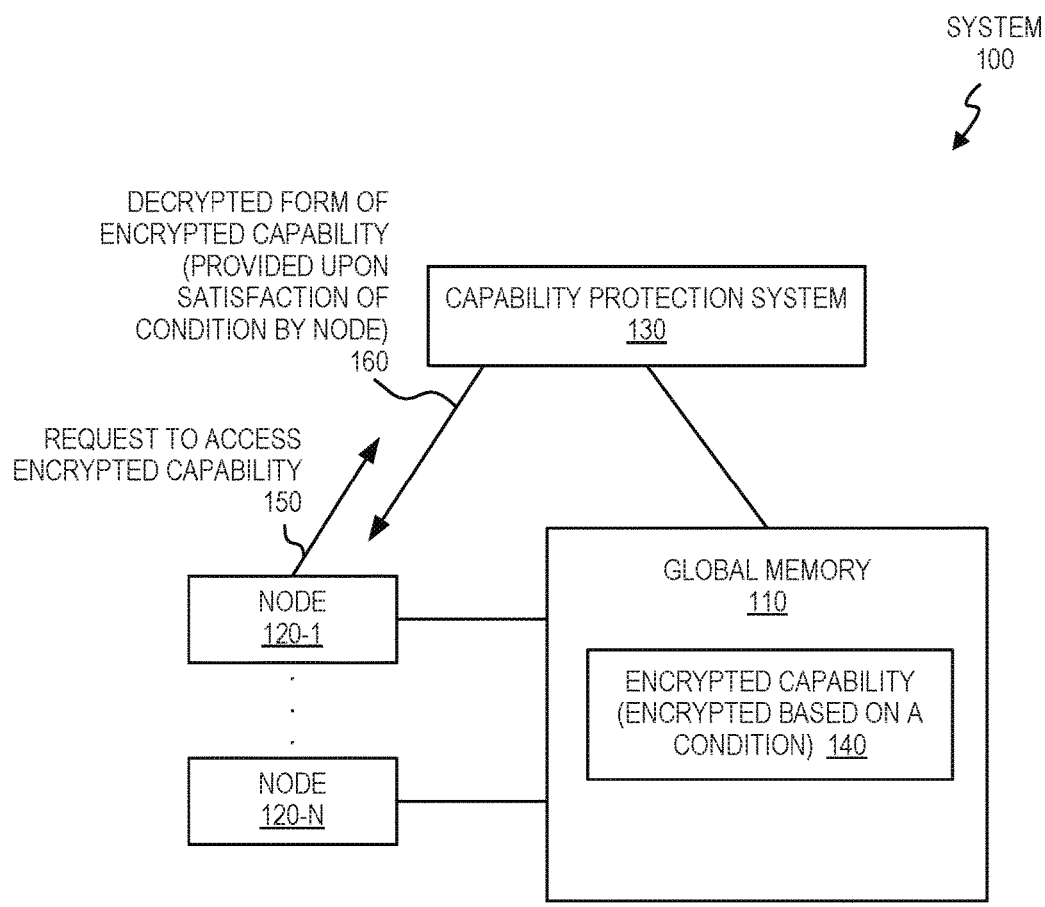
FIG. 1 is a block diagram that depicts an example system that stores encrypted capabilities in global memory.

Throughout the drawings, a hyphenated index number "N" appended to some of the reference numerals may be understood to merely denote plurality and may not necessarily represent the same quantity for each reference numeral having such an index number "N". Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

Capabilities are tokens of authority that grant programs and processes access to resources of a system, such as memory or services. For example, a capability may have a form that includes a resource name, resource permissions, and a random value. The random value may be essentially unguessable, owing at least in part to having a long length. When a process presents the capability to access a resource, the entity that controls access to the resource (e.g., a resource controller) will validate the random value before allowing the process to access the resource. For example, the random value may be validated against a reference table of valid capabilities.

Within a closed system, such as within a single compute node, unforgeability of capabilities may be accomplished by virtue of processor architecture, memory architecture, instruction set architecture (ISA), or a combination thereof. For example, capabilities may be loaded into capability registers, and may be dereferenced, manipulated, or otherwise accessed solely through privileged instructions of the ISA. In this manner, the closed system is a trust domain within which capabilities can be trusted.

It may be useful in some instances to employ capabilities for managing large amounts of memory, such as in example rack scale systems with petabytes or more of non-volatile memory and many compute nodes running many applications and users. In such instances, capabilities may be distributed among nodes by explicit copying from one node to another, but it may be more efficient to store capabilities in global shared memory for direct access by nodes. However, systems with global shared memory such as rack scale systems may not offer trust guarantees among the nodes, and capabilities may be propagated in an uncontrolled manner.

The foregoing technical challenges may be overcome by examples presented herein, which may provide control over the propagation of the capabilities stored in global memory by gating use of the shared capabilities to proof of certain conditions. In some implementations, the capabilities stored in global memory are encrypted based on a condition using attribute-based encryption or identity-based encryption. For example, the condition may be proof that a node can be trusted (e.g., the node can present an expected operating system identity or hash). A capability protection system may receive a request from a node to access the encrypted capability. If the requesting node can satisfy the condition, the capability protection system may decrypt the encrypted capability and provide the decrypted capability to the requesting node.

By virtue of the foregoing, capabilities may be shared efficiently and implicitly in global memory and without explicit copying from node to node. Also, capabilities shared in such a centrally accessible manner may reduce the need for global synchronization. Moreover, the use of capabilities may be tied to and enforced by the satisfaction of customizable policies, thus reducing or eliminating unauthorized capability propagation and without interfering with other capability mechanisms (e.g., loading, storing, revocation, etc.).

Example capability protection systems described herein may be implemented securely in a centralized trusted manager or in a distributed implementation (e.g., in memory fabric interconnects). Such implementations provide greater security than reliance on node or hypervisor software to handle encryption and decryption of shared capabilities.

Referring now to the figures, FIG. 1 is a block diagram that depicts an example system 100. The system 100 may be a computing device, such as a server, a rack scale server, a multi-node computer, etc. The system 100 includes a global memory 110, a plurality of nodes 120-1 through 120-N (also referred to collectively as nodes 120 or individually and generally as a node 120), and a capability protection system 130.

Each of the nodes 120 may employ a processing resource, such as a microcontroller, a microprocessor, central processing unit (CPU) core, an application-specific integrated circuit (ASIC), a field programmable gate array (FPGA), and/or the like. The processing resource may be physical hardware or may be a virtualized processing resource.

In some implementations, some or all of the nodes 120 may each employ local memory (not shown) coupled to the processing resource of that node. The local memory may be private and accessible only to the processing resource to which it is coupled. The local memory may be, for example, volatile dynamic random access memory (DRAM), and may offer the node fast read/write speeds for local processing.

Each node 120 may run or execute an independent kernel and an operating system. In some cases, the kernel and the operating system may be one and the same. In some implementations, the nodes 120 may implement capability support, by way of a capability-supporting instruction set architecture for example. For example, the instruction set architecture may provide capability load or store instructions.

The global memory 110 may include any volatile memory (e.g., DRAM, static random access memory or SRAM, etc.) and/or persistent memory formed from non-volatile memory or storage devices (e.g., flash memory devices, phase-change memory devices, spin-transfer torque memory devices, resistive random-access memory or memristive devices, hard disk drives, solid state drives, etc.). The global memory 110 may be global in the sense that the memory 110 is accessible by some or all or the nodes 120. In other words, the plurality of nodes 120 may be in communication with the global memory 110.

The capability protection system 130 may be implemented as electronic circuitry or logic to implement the functionalities described herein. Additionally or alternatively, the capability protection system 130 may be implemented as a combination of hardware (e.g., a processing resource) and programming (i.e., instructions stored on a machine readable medium and executable by the hardware). In some examples, the capability protection system 130 may be implemented as a centralized trusted manager, for example, as part of a top-of-rack management apparatus (e.g., a switch or a server). In some examples, the capability protection system 130 may be implemented in a distributed manner, for example, as included in a management processor included with each node 120 or as included in interconnects that connect nodes 120 to the global memory 110.

The capability protection system 130 may store an encrypted capability 140 into the global memory 110. More particularly, the encrypted capability 140 may be encrypted based on a condition. For example, the encrypted capability 140 may be encrypted by attribute-based encryption (ABE) or identity-based encryption (IBE), and the condition on which encryption is based may be an attribute or identity, respectively. The encrypted capability 140 may be encrypted by other schemes similar to ABE or IBE (e.g., schemes within the class of functional encryption).

In general terms, identity-based encryption encrypts data using a key that is computed based on an identity, such as (but not necessarily) the identity of a receiving party. The encryption key may be provided by a trusted third party. To decrypt the data, a receiving party authorized to use the same identity on which encryption was based contacts the trusted third party to retrieve a private decryption key.

Attribute-based encryption encrypts data using a key that is associated with a set of attributes or properties. The encryption key may be provided by a trusted third party. To decrypt the data, the receiving party proves to the trusted third party that the receiving party satisfies the attributes or properties associated with the encrypted data (e.g., by holding matching attributes). Attribute-based encryption as referred to herein may include variants such as key-policy ABE or ciphertext-policy ABE.

In either ABE or IBE as applied to the system 100, the capability protection system 130 may serve as a trusted third party.

The capability protection system 130 may receive, from a node (e.g., 120-1) of the plurality of nodes 120, a request (e.g., 150) to access the encrypted capability 140 stored in the global memory 110. In response to the request 150, the capability protection system 130 may provide to the node 120-1 a decrypted form 160 of the encrypted capability 140 upon satisfaction of the condition by the node. In particular, under an attribute-based encryption scheme or an identity-based encryption scheme, a node 120 seeking to access and use an encrypted element 140 stored in the global memory 110 must first satisfy the condition on which encryption was based, i.e., by presenting an authorized identity or by holding matching attributes.

Upon satisfaction of the condition by the node 120, the capability protection system 130 may decrypt the encrypted capability 140 to generate the decrypted form 160 that is provided to the node 120. By performing the decryption at the capability protection system 130, the system 100 may maintain secrecy of decryption keys. In other implementations, the capability protection system 130 may provide a decryption key to the requesting node 120 for the requesting node 120 to decrypt the encrypted capability 140.

Some non-exhaustive examples of encryption conditions are as follows. In some implementations, an encrypted capability 140 may be encrypted based on a condition that includes an operating system identity, and satisfaction of the condition for decryption may include the node 120 presenting that operating system identity. In some implementations, an encrypted capability 140 may be encrypted based on a condition that includes a signature of an operating system image (e.g., integrity or hash signature), and satisfaction of the condition for decryption may include the node 120 presenting that signature. The foregoing example conditions may act as a mechanism by which nodes that are non-trusted by default can demonstrate trustworthiness and join or extend a trust domain, at least for the purpose of accessing an encrypted capability. Other attribute or identity properties may serve as conditions, in addition to the foregoing.

In some implementations, an encrypted capability 140 may be encrypted based on a condition that includes a time range within which decryption is permitted, and satisfaction of the condition for decryption may include the node requesting access to the encrypted capability 140 within the time range (e.g., request 150 may include a time stamp in the time range). The foregoing example condition may be useful for managing or restricting access to system resources in view of a contract or service-level agreement.

By virtue of the foregoing, resource capabilities may be efficiently and implicitly shared in a multi-node system, such as the system 100, by storing the capabilities in global memory, while maintaining access and propagation control over the capabilities via condition-based encryption.

Figure 2:
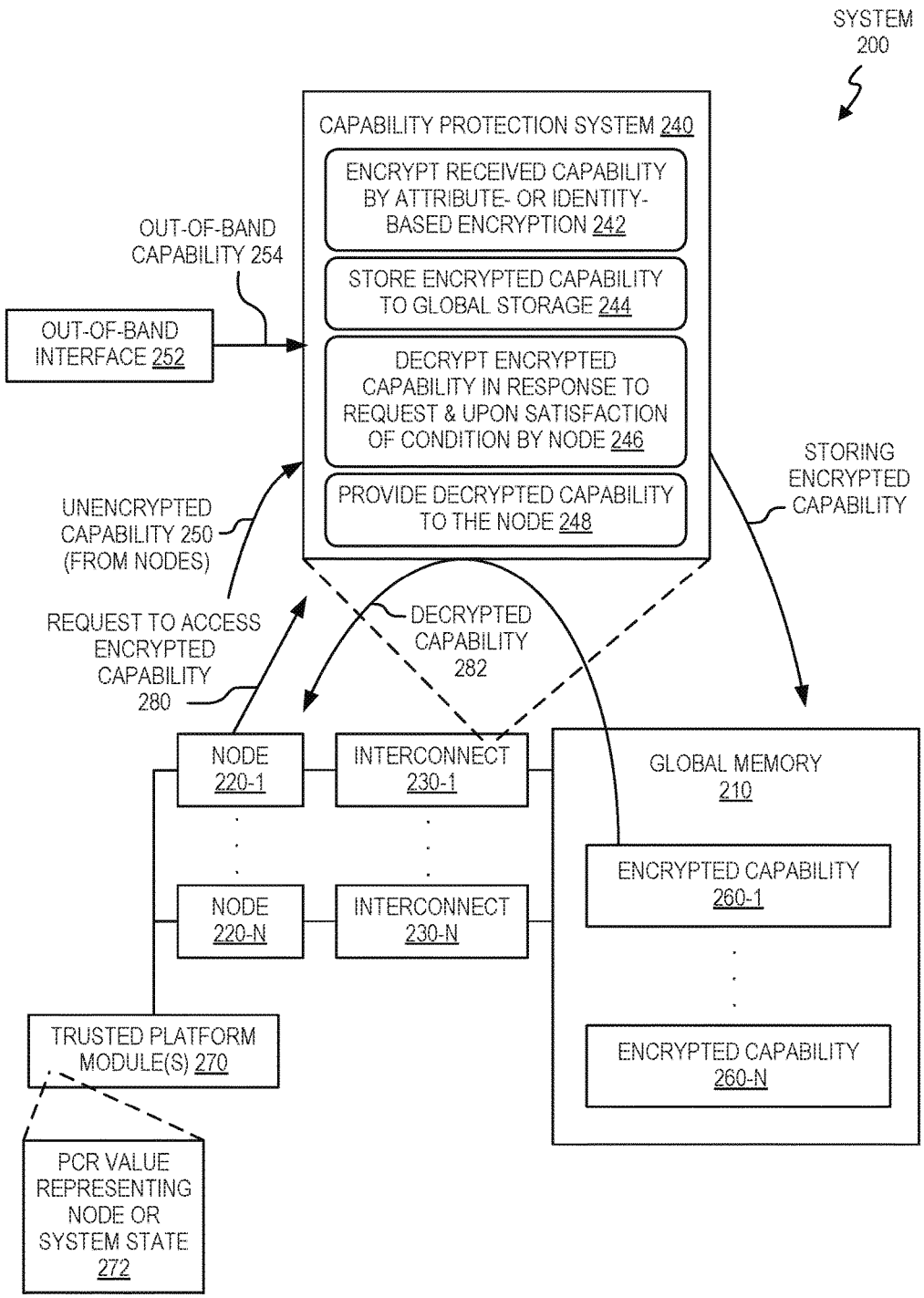
FIG. 2 is a block diagram that depicts another example system that stores encrypted capabilities in global memory.

FIG. 2 is a block diagram that depicts another example system 200 that stores encrypted capabilities in global memory. The system 200 may be a computing device, such as a server, a rack scale server, a multi-node computer, etc. The system 200 includes a global memory 210 and a plurality of nodes 220-1 through 220-N (also referred to collectively as nodes 220 or individually and generally as a node 220). The global memory 210 and the plurality of nodes 220 may be analogous in many respects to the global memory 110 and the nodes 120 of FIG. 1, respectively. In particular, the global memory 210 may be accessible from some or all of the nodes 220, and may store encrypted capabilities (e.g., 260-1 through 260-N; also referred to collectively as encrypted capabilities 260 and generally and individually, an encrypted capability 260). The capabilities 260 may provide access to resources, such as regions of the global memory 210.

The nodes 220 may communicate with the global memory 210 by way of a fabric, and more particularly, a memory fabric. The fabric may include, in some implementations, a plurality of interconnects 230-1 through 230-N (also referred to collectively as interconnects 230 or individually and generally as an interconnect 230). In some implementations, each node 220 may be connected to the global memory 210 by a corresponding dedicated interconnect 230 (e.g., node 220-1 connects via interconnect 230-1, node 220-N connects via interconnect 230-N, etc.). The interconnects 230 may be implemented as electronic circuitry or logic, or as a combination of hardware and programming, for directing memory communications (e.g., load and store operations) between the nodes 220 and the global memory 210 according to an interconnect protocol.

In some implementations, the system 200 also may include a trusted platform module (TPM) 270, which may be an electronic component such as a chip or a microcontroller that measures aspects of the system 200 or individual nodes 220 and generates and stores platform configuration register (PCR) values (e.g. 272). For example, the measurements may relate to how the system 200 or node 220 is configured, including aspects such as BIOS (basic input/output system), operating system (OS), applications, etc. A PCR value 272 may be hash chain computed from such measurement(s). Accordingly, a PCR value 272 may represent a state of the system 200 or the node(s) 220. A TPM may store multiple PCR values.

In the example depicted in FIG. 2, the system 200 includes a capability protection system 240 implemented across the interconnects 230. For example, the capability protection system 240 may be distributed among the fabric interconnects 230 that couple the global memory 210 and the plurality of nodes 220. More particularly, the capability protection system 240 may be implemented in the interconnect protocol and as part of the electronic circuitry/logic or programming of each interconnect 230. The capability protection system 240 implemented on each interconnect 230 may, in some examples, communicate with each other or communicate with central services of the system 200. In other implementations, the capability protection system 240 may be implemented in a centralized manner, such as in a centralized trusted manager.

FIG. 2 depicts non-exhaustive example functionality 242, 244, 246, 248 of the capability protection system 240, which will be described in greater detail below. The capability protection system 240 may include a hardware-based cryptographic engine or the like, for performing encryption and/or decryption according to ABE and/or IBE or the like.

The capability protection system 240 may receive capabilities to be stored securely in the global memory 210. For example, the capability protection system 240 may receive an unencrypted capability 250 from any node of the plurality of nodes 220. In other examples, the capability protection system 240 may receive an encrypted or unencrypted capability 254 from an out-of-band interface 252. An out-of-band capability 254 may be received over the out-of-band interface 252 from a management system for example, and may be useful for prepopulating the global memory 210 with shared capabilities (e.g., a static or default capability provided during a system boot or memory fabric initialization).

If the received capability is already encrypted (e.g., received in encrypted form over the out-of-band interface 252), the capability protection system 240 may determine to store the received encrypted capability to the global memory 210 as an encrypted capability 260.

If the received capability is unencrypted (e.g., an unencrypted capability 250 received from the nodes 220 or an unencrypted capability 254 received via the out-of-band interface 252), the capability protection system 240 may encrypt (242) the received unencrypted capability (e.g., 250 or 254) to generate an encrypted capability by attribute-based encryption or identity-based encryption based on a condition. In this manner, the capability protection system 240 serves as a trusted third party for ABE or IBE.

The encryption condition(s) may be established by a centralized or distributed policy. For example, the policy may be centralized if provided by a policy service of a centralized trusted manager or may be distributed if implemented across the interconnects 230. In some implementations, the policy may dictate the condition to be used in encryption depending on which node of the plurality of nodes 220 is sending the unencrypted capability 250 to global memory 210. For example, each interconnect 230 may have in place a policy for the associated node 220, or a node 220 may coordinate with a centralized policy service to determine a node-specific condition.

Example conditions may be analogous to those described above with respect to FIG. 1. Another example encryption condition may include a PCR value representing a trusted state (or in other words, an expected PCR value).

Once an unencrypted capability (e.g., 250 or 254) is encrypted, the capability protection system 240 may store (244) the encrypted form of that capability into the global memory 210 as an encrypted capability 260. The capability protection system 240 may receive, from any node of the plurality of nodes 220, a request to access an encrypted capability 260 stored in the global memory 210. In response to the request, the capability protection system 240 may decrypt (246) the requested encrypted capability according to ABE or IBE (according to how capability 260 was encrypted) to generate a decrypted capability, upon or after satisfaction by the node of the condition associated with that encrypted capability 260. The capability protection system 240 may then provide (248) the decrypted capability to the requesting node. If the condition is not met, access to the encrypted capability 260 is denied, and an error message may be sent to the requesting node in some implementations.

To illustrate, FIG. 2 depicts a node 220-1 sending a request 280 to access encrypted capability 260-1. If the node 220-1 meets the conditions associated with the encryption of capability 260-1, the capability protection system 240 can successfully decrypt the encrypted capability 260-1 as appropriate and provide a decrypted form of the encrypted capability (decrypted capability 282) to the node 220-1.

Satisfaction of a condition may be analogous to that described above with respect to FIG. 1 for a corresponding encryption condition. Additionally, in the example where an encryption condition may include a PCR value representing a trusted state, satisfaction of the decryption condition may include the requesting node (e.g., 220-1) presenting PCR values 272, which represent the state of that node (220-1), that match the encryption condition PCR value, which represents a trusted state. In this manner, the capability protection system 240 may be assured that the requesting node is booted in a known good manner (e.g., using authorized firmware and software) before providing access to a capability 260. PCR values 272 not matching encryption condition PCR values may indicate that a node is compromised by viruses or malware, is improperly configured or modified, or otherwise in an untrustworthy state.

The requesting node 220 may satisfy the condition for decryption directly, that is, by the node 220 itself bearing the identity or attributes with which the encrypted capability 260 was encrypted. In some implementations, the requesting node 220 may perform additional work to satisfy the condition, such as communicating with another entity (e.g., the node originating the encrypted capability 260, a centralized trusted manager, etc.) to obtain elements of proof to satisfy the condition.

In some implementations, the global memory 210 may store a plurality of encrypted capabilities 260 with different respective encryption conditions. For example, encrypted capability 260-1 may be encrypted based on different conditions than an encrypted capability 260-2 (not shown). By virtue of the different respective encryption conditions, different trust domains are established. Groups of nodes 220 that can satisfy a particular encryption condition (e.g., operating system identity, PCR value, etc.) may be deemed to belong to the trust domain associated with the corresponding encrypted capability 260.

Figure 3:
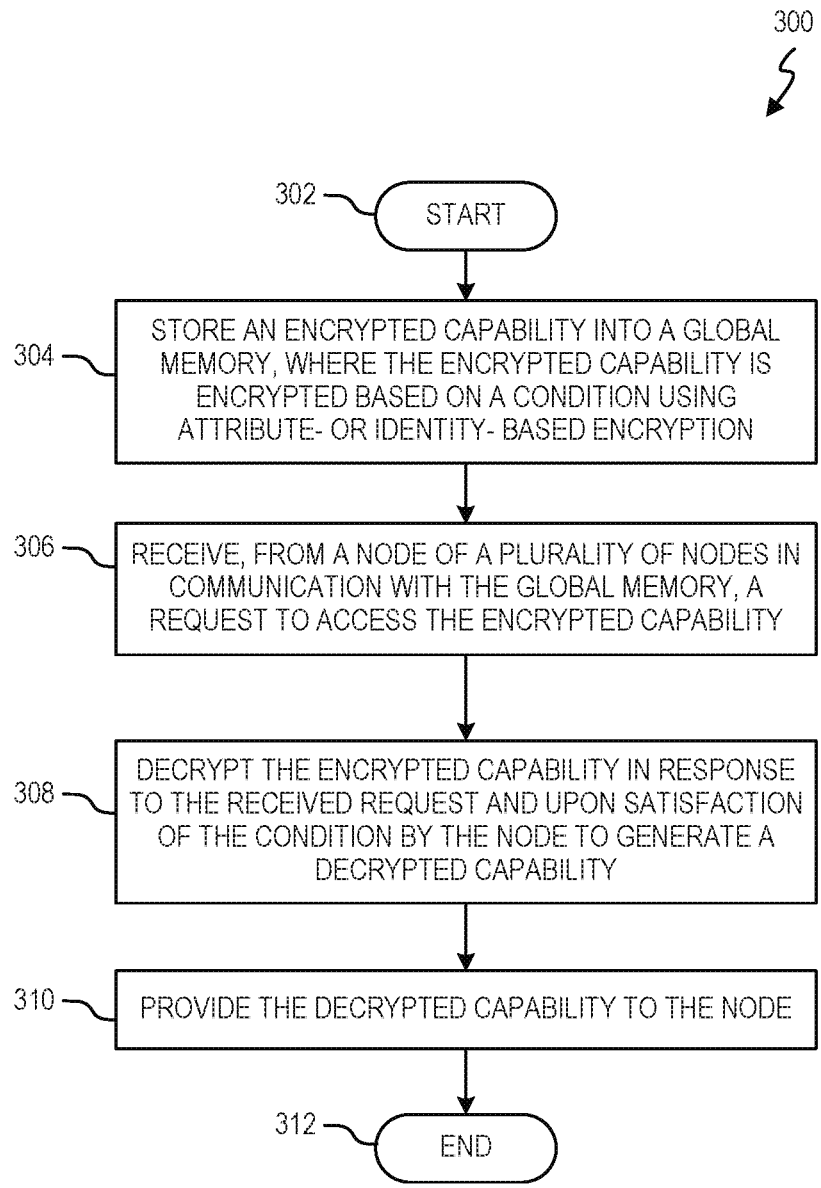
FIG. 3 is a flow diagram depicting an example method for storing an encrypted capability into global memory and decrypting the encrypted capability.

FIG. 3 is a flow diagram depicting an example method 300 storing encrypted capability into global memory and decrypting the encrypted capability. Method 300 may be implemented in the form of electronic circuitry or logic and/or in the form of executable instructions stored on a machine readable medium and executed by a processing resource. For example, method 300 may be described below for illustrative purposes as being performed by a capability protection system (e.g., 130 or 240). In some implementations, one or more blocks of method 300 may be executed substantially concurrently or in a different order than shown in FIG. 3. In some implementations, method 300 may include more or fewer blocks than are shown in FIG. 3. In some implementations, one or more of the blocks of method 300 may, at certain times, be ongoing and/or may repeat.

Method 300 may begin at block 302 and continue to block 304 where a capability protection system (e.g., 130) may store an encrypted capability (e.g., 140) into a global memory (e.g., 110). The encrypted capability may be encrypted based on a condition using attribute-based encryption or identity-based encryption.

At block 306, the capability protection system may receive, from a node (e.g., 120-1) of a plurality of nodes (e.g., 120) in communication with the global memory, a request (e.g., 150) to access the encrypted capability stored in the global memory. At block 308, the capability protection system may decrypt the encrypted capability in response to the request received at block 306 and upon satisfaction of the condition by the node to generate a decrypted capability.

At block 310, the capability protection system may provide the decrypted capability (e.g., 160) to the node. Method 300 may end at block 312.

Figure 4:
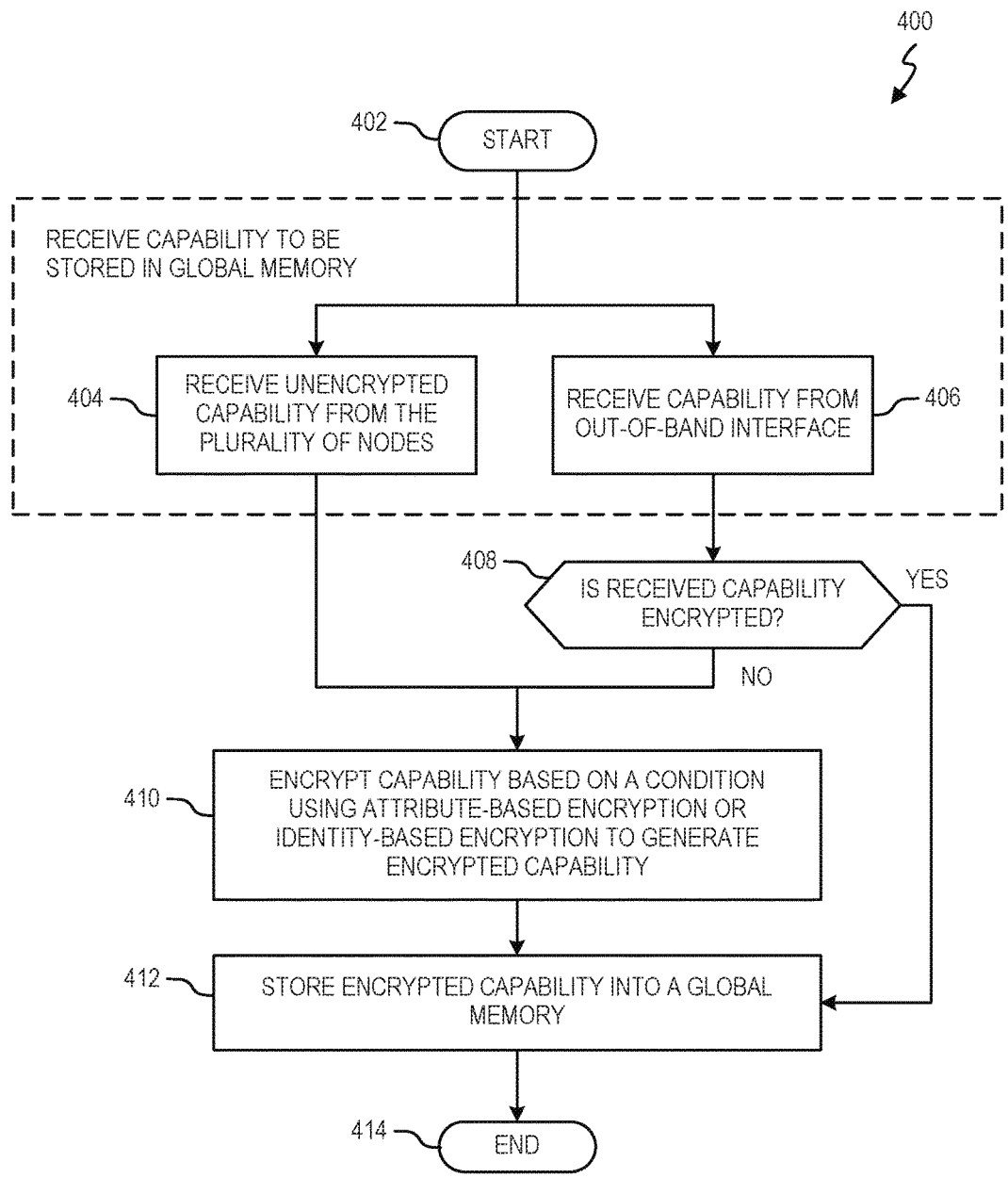
FIG. 4 is a flow diagram depicting an example method for receiving and encrypting a capability.

FIG. 4 is a flow diagram 400 depicting an example method for receiving and encrypting a capability. As with method 300, method 400 may be implemented in the form of electronic circuitry and/or logic or in the form of executable instructions stored on a machine readable medium and executed by a processing resource. Method 400 may be described below as being performed by a capability protection system (e.g., 240). In some implementations, one or more blocks of method 400 may be executed substantially concurrently or in a different order than shown in FIG. 4, method 400 may include more or fewer blocks than are shown in FIG. 4, and one or more of the blocks of method 400 may be ongoing and/or may repeat.

Method 400 may begin at block 402 and proceed to a stage where a capability protection system may receive a capability to be stored in global memory. The capability protection system may receive a capability from various sources. For example, at block 404, the capability protection system may receive an unencrypted capability (e.g., 250) from a node of the plurality of nodes (e.g., 220) and then proceed to block 410, which will be described below.

Alternatively or additionally, the capability protection may receive at block 406 a capability (e.g., 254) from an out-of-band interface (e.g., 252). Such a capability from an out-of-band interface may be useful for prepopulating the global memory with global capabilities. If the received capability is encrypted ("YES" at block 408), the capability protection system may proceed to block 412 and store the received capability as an encrypted capability (e.g., 260) in the global memory (e.g., 210). If the received capability is unencrypted ("NO" at block 408), the capability protection system proceeds to block 410.

At block 410, the capability protection system encrypts a received unencrypted capability, whether from an out-of-band interface or from a node, based on a condition and using attribute-based encryption or identity-based encryption to generate an encrypted capability. In some implementations, the condition for encryption may be provided by a policy available from a central policy service or in a distributed manner (e.g., across memory fabric interconnects). At block 412, the capability protection system stores the encrypted capability generated by block 410 into global memory. Method 400 ends at block 414.

In some implementations, method 400 may be employed by a capability protection system in conjunction with method 300. For example, block 412 and block 304 may be analogous in many respects, and a capability protection system may perform block 306 after block 412. Moreover, the condition on which encryption at block 410 is based or by which a pre-encrypted out-of-band capability was encrypted, may be the condition that is to be satisfied for the encrypted capability to be decrypted at block 308.

For example, an encryption condition may include a time range within which decryption is permitted, and satisfaction of the condition by the node may include the request including a time stamp within the time range. In another example, the encryption condition may include an operating system identity or a signature of an operating system image, and satisfaction of the condition may include the node presenting the operating system identity or the signature, respectively. In another example, the condition includes a PCR value representing a trusted state, and satisfaction of the decryption condition includes the node presenting a TPM-generated PCR value that matches the PCR value of the condition.

Figure 5:
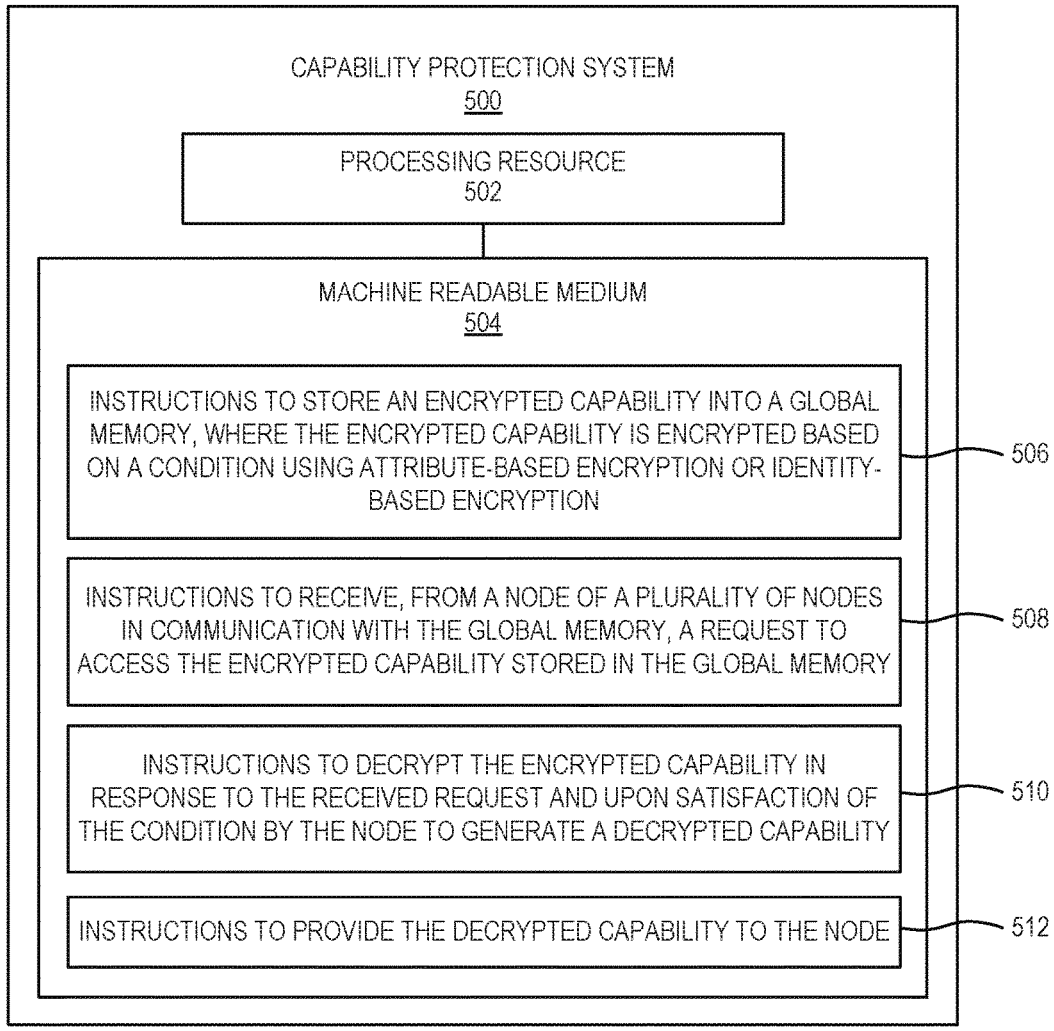
FIG. 5 is a block diagram of an example capability protection system that includes a non-transitory, machine readable medium encoded with example instructions to store an encrypted capability and decrypt the encrypted capability.

FIG. 5 is a block diagram of an example capability protection system 500 that includes a processing resource 502 coupled to a non-transitory, machine readable medium 504 encoded with example instructions to store an encrypted capability and decrypt the encrypted capability. The capability protection system 500 may be in communication with a plurality of nodes (e.g., similar to nodes 120 or 220) and global memory (e.g., similar to global memory 110 or 210). In some implementations, the capability protection system 500 may serve as or form part of the capability protection system 130 or 240, and may implement aspects of method 300 or 400.

The processing resource 502 may include electronic circuitry or logic for performing the functionality of the instructions described herein. Additionally or alternatively, the processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples.

The machine readable medium 504 may be any medium suitable for storing executable instructions, such as RAM, ROM, EEPROM, flash memory, a hard disk drive, an optical disc, or the like. In some example implementations, the machine readable medium 504 may be a tangible, non-transitory medium, where the term "non-transitory" does not encompass transitory propagating signals. The machine readable medium 504 may be disposed within the capability protection system 500, as shown in FIG. 5, in which case the executable instructions may be deemed "installed" or "embedded" on the system 500. Alternatively, the machine readable medium 504 may be a portable storage medium, and may be part of an "installation package." The instructions stored on the machine readable medium 504 may be part of an interconnect protocol.

As described further herein below, the machine readable medium 504 may be encoded with a set of executable instructions 506, 508, 510, 512. It should be understood that part or all of the executable instructions and/or electronic circuits included within one box may, in alternate implementations, be included in a different box shown in the figures or in a different box not shown.

Instructions 506, when executed by the processing resource 502, may store an encrypted capability into a global memory. The encrypted capability may be encrypted based on a condition using attribute-based encryption or identity-based encryption.

Instructions 508, when executed by the processing resource 502, may receive, from a node of a plurality of nodes in communication with the global memory, a request to access the encrypted capability stored in the global memory.

Instructions 510, when executed by the processing resource 502, may decrypt the encrypted capability in response to the received request (received by instructions 508) and upon satisfaction of the condition by the node issuing the request, to generate a decrypted capability. The condition and satisfaction thereof may be analogous in many respects to any of the various example conditions described above.

Instructions 512, when executed by the processing resource 502, may provide the decrypted capability (generated by instructions 510) to the requesting node.

Figure 6:
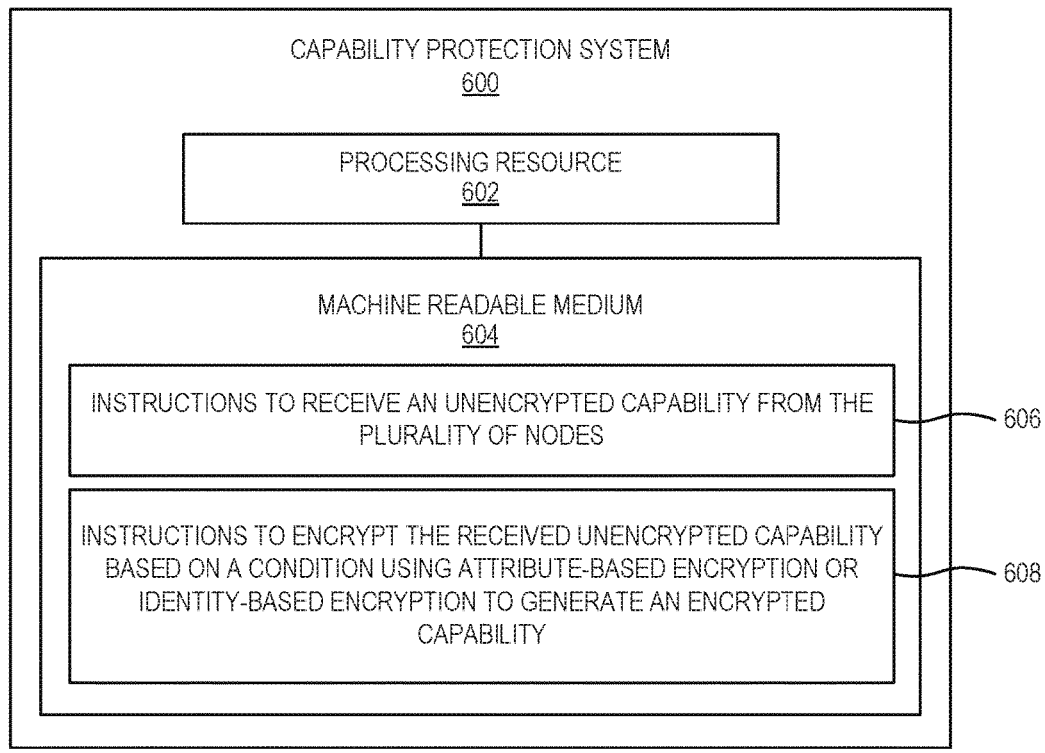
FIG. 6 is a block diagram of an example capability protection system that includes a non-transitory, machine readable medium encoded with example instructions to receive and encrypt a capability.

FIG. 6 is a block diagram of an example capability protection system 600 that includes a non-transitory, machine readable medium 604 encoded with example instructions to receive and encrypt a capability. The processing resource 602 and the machine readable medium 604 may be analogous in many respects to the processing resource 502 and the machine readable medium 504, respectively. In some implementations, the instructions of the capability protection system 600 may operate in conjunction with the instructions of the capability protection system 500 (e.g., by combination of systems 500 and 600).

Instructions 606, when executed by the processing resource 602, may receive an unencrypted capability from the plurality of nodes (e.g., similar to nodes 120 or 220). Instructions 608, when executed by the processing resource 602, may encrypt the received unencrypted capability based on a condition using attribute-based encryption or identity-based encryption to generate an encrypted capability. Examples of a condition for ABE or IBE of an unencrypted capability may be analogous to those described above, with respect to FIG. 1 for example. Instructions 608 also may be useful for encrypting other unencrypted capabilities, such as those that may be received from an out-of-band interface.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
a global memory;
a plurality of nodes in communication with the global memory;
a capability protection system to:
store an encrypted capability into the global memory, where the encrypted capability is encrypted based on a condition to maintain propagation control over sharing of the encrypted capability in the global memory, wherein the condition includes a platform configuration register (PCR) value representing a trusted state,
receive, from a node of the plurality of nodes, a request to access the encrypted capability stored in the global memory, and
provide to the node a decrypted form of the encrypted capability upon satisfaction of the condition by the node, wherein the node has a capability-supporting architecture and uses privileged capability instructions with the decrypted form of the encrypted capability to access system resources controlled by the encrypted capability; and
a trusted platform module to generate a PCR value representing a state of the node, wherein satisfaction of the condition includes the node presenting the PCR value representing the state of the node matching the PCR value representing the trusted state.

2. The system of claim 1, wherein the capability protection system is to:
receive an unencrypted capability from the plurality of nodes, and
encrypt the received unencrypted capability to generate the encrypted capability by attribute-based encryption or identity-based encryption and based on the condition.

3. The system of claim 1, wherein the encrypted capability is received by the capability protection system from an out-of-band interface to prepopulate the global memory with a global capability.

4. The system of claim 1, wherein the capability protection system is distributed among fabric interconnects that couple respective ones of the plurality of nodes to the global memory.

5. The system of claim 1, wherein the capability protection system stores into the global memory another encrypted capability that is encrypted based on a time range within which decryption is permitted, and
the capability protection system provides to the node a decrypted form of the another encrypted capability in response to a request from the node for access to the another encrypted capability that includes a time stamp within the time range.

6. The system of claim 1, wherein the capability protection system stores into the global memory another encrypted capability that is encrypted based on an operating system identity, and
the capability protection system provides to the node a decrypted form of the another encrypted capability in response to a request from the node for access to the another encrypted capability that presents the operating system identity.

7. The system of claim 1, wherein the capability protection system stores into the global memory another encrypted capability that is encrypted based on a signature of an operating system image, and the capability protection system provides to the node a decrypted form of the another encrypted capability in response to a request from the node for access to the another encrypted capability that presents the signature.

8. The system of claim 1, wherein the global memory stores a plurality of encrypted capabilities with different respective encryption conditions, and the different respective encryption conditions establish different trust domains.

9. The system of claim 1, wherein the plurality of nodes and the global memory form part of a rack scale system and the capabilities provide access to regions of the global memory.

10. A method comprising:

storing, by a capability protection system, an encrypted capability into a global memory, where the encrypted capability is encrypted based on a condition using attribute-based encryption or identity-based encryption to maintain propagation control over sharing of the encrypted capability in the global memory, wherein the condition includes a platform configuration register (PCR) value representing a trusted state;

receiving, by the capability protection system and from a node of a plurality of nodes in communication with the global memory, a request to access the encrypted capability stored in the global memory;

decrypting, by the capability protection system, the encrypted capability in response to the received request and upon satisfaction of the condition by the node to generate a decrypted capability, wherein satisfaction of the decryption condition includes the node presenting a trusted platform module-generated PCR value that matches the PCR value representing the trusted state; and providing, by the capability protection system, the decrypted capability to the node, wherein the node has a capability-supporting architecture and uses privileged capability instructions with the decrypted form of the encrypted capability to access system resources controlled by the encrypted capability.

11. The method of claim 10, further comprising:

receiving, by the capability protection system, an unencrypted capability from the plurality of nodes, and encrypting, by the capability protection system, the received unencrypted capability based on the condition using attribute-based encryption or identity-based encryption to generate the encrypted capability.

12. The method of claim 10, further comprising:

receiving, by the capability protection system, a capability from an out-of-band interface to prepopulate the global memory with a global capability;

if the received capability is encrypted, storing the received capability as the encrypted capability into the global memory; and if the received capability is unencrypted, encrypting the received capability based on the condition using attribute-based encryption or identity-based encryption to generate the encrypted capability.

13. The method of claim 10, wherein the capability protection system is distributed among fabric interconnects that couple respective ones of the plurality of nodes to the global memory.

14. The method of claim 10, comprising:

storing, by the capability encryption system and into the global memory, another encrypted capability that is encrypted based on a time range within which decryption is permitted; and decrypting, by the capability protection system, the another encrypted capability in response to a request from the node for access to the another encrypted capability that includes a time stamp within the time range.

15. The method of claim 10, comprising:

storing, by the capability encryption system and into the global memory, another encrypted capability that is encrypted based on an operating system identity or a signature of an operating system image, and decrypting, by the capability protection system, the another encrypted capability in response to a request from the node for access to the another encrypted capability that presents the operating system identity or the signature, respectively.

16. A non-transitory machine readable medium storing instructions executable by a processing resource of a capability protection system, the non-transitory machine readable medium comprising:

instructions to store an encrypted capability into a global memory, where the encrypted capability is encrypted based on a condition using attribute-based encryption or identity-based encryption to maintain propagation control over sharing of the encrypted capability in the global memory, wherein the condition includes a platform configuration register (PCR) value representing a trusted state;

instructions to receive, from a node of a plurality of nodes in communication with the global memory, a request to access the encrypted capability stored in the global memory;

instructions to decrypt the encrypted capability in response to the received request and upon satisfaction of the condition by the node to generate a decrypted capability, satisfaction of the decryption condition including the node presenting a trusted platform module-generated PCR value that matches the PCR value representing the trusted state; and instructions to provide the decrypted capability to the node, wherein the node has a capability-supporting architecture and uses privileged capability instructions with the decrypted form of the encrypted capability to access system resources controlled by the encrypted capability.

17. The non-transitory machine readable medium of claim 16, further comprising:

instructions to receive an unencrypted capability from the plurality of nodes, and instructions to encrypt the received unencrypted capability based on the condition using attribute-based encryption or identity-based encryption to generate the encrypted capability.

18. The non-transitory machine readable medium of claim 16, further comprising:

instructions to generate another encrypted capability by encrypting an unencrypted capability based on a time range within which decryption is permitted; and instructions to decrypt the another encrypted capability in response to a request from the node for access to the another encrypted capability that includes a time stamp within the time range.

19. The non-transitory machine readable medium of claim 16, further comprising:

instructions to generate another encrypted capability by encrypting an unencrypted capability based on an operating system identity or a signature of an operating system image; and instructions to decrypt the another encrypted capability in response to a request from the node for access to the another encrypted capability that includes the operating system identity or the signature.

\* \* \* \* \*